Figure 1:
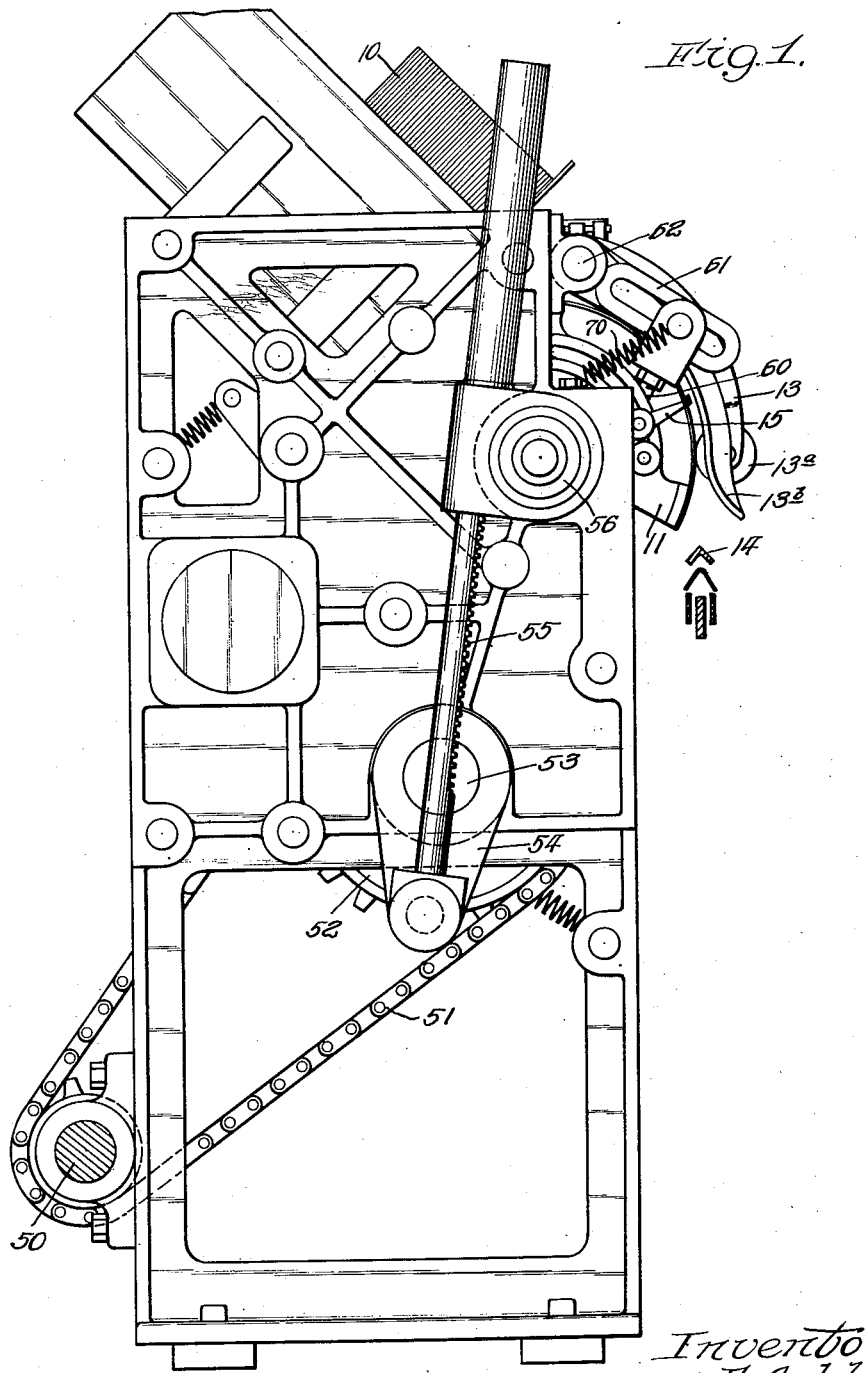

Oct. 29, 1940.　　　R. E. ACKLEY　　　2,219,608

FEEDER FOR STITCHING MACHINES

Filed April 29, 1939　　10 Sheets-Sheet 1

Inventor:
Raymond E. Ackley,
By Clinton, Wiley, Davis, Hinckle & Dawson,
Attys.

Oct. 29, 1940.  R. E. ACKLEY  2,219,608
FEEDER FOR STITCHING MACHINES
Filed April 29, 1939  10 Sheets-Sheet 2

Inventor:
Raymond E. Ackley,
By Clinton, Wiley, Davies, Hinckl & Dawson, Attys.

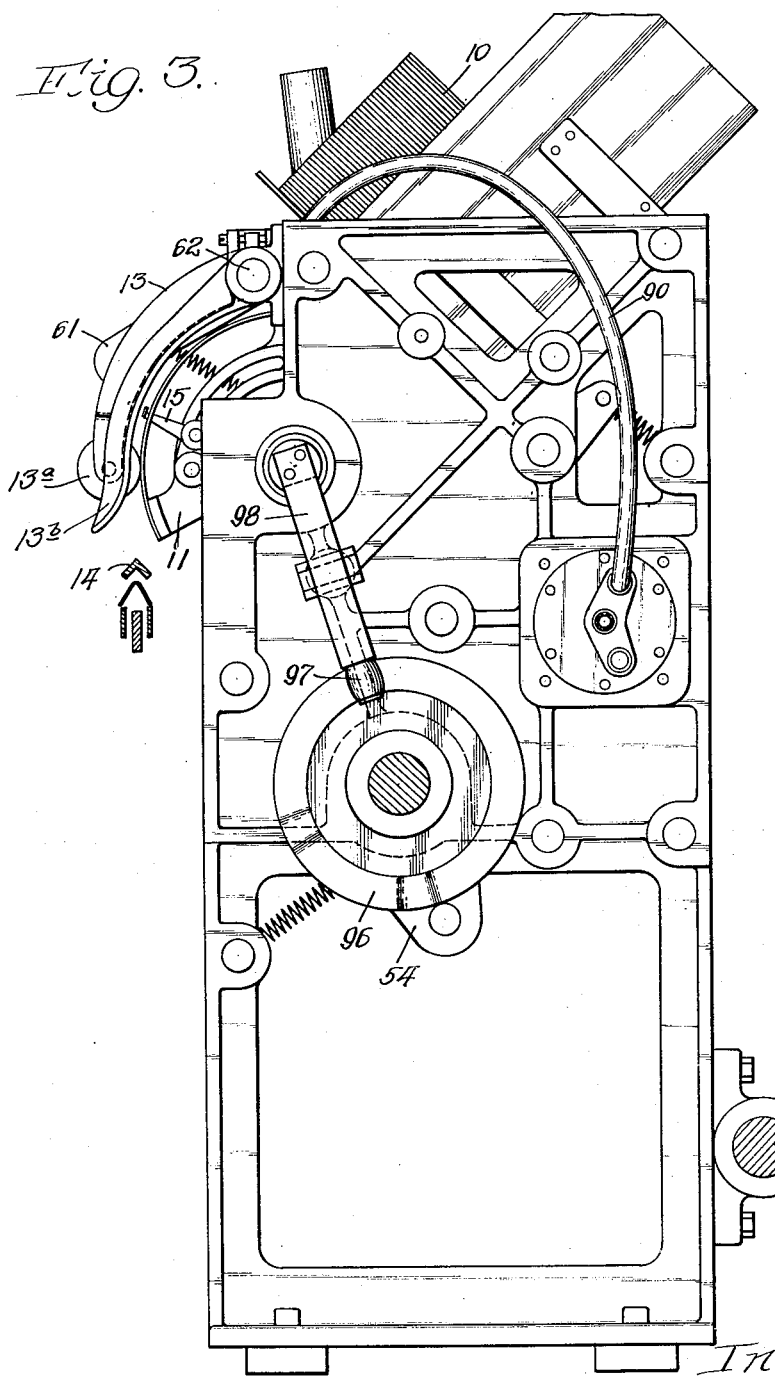

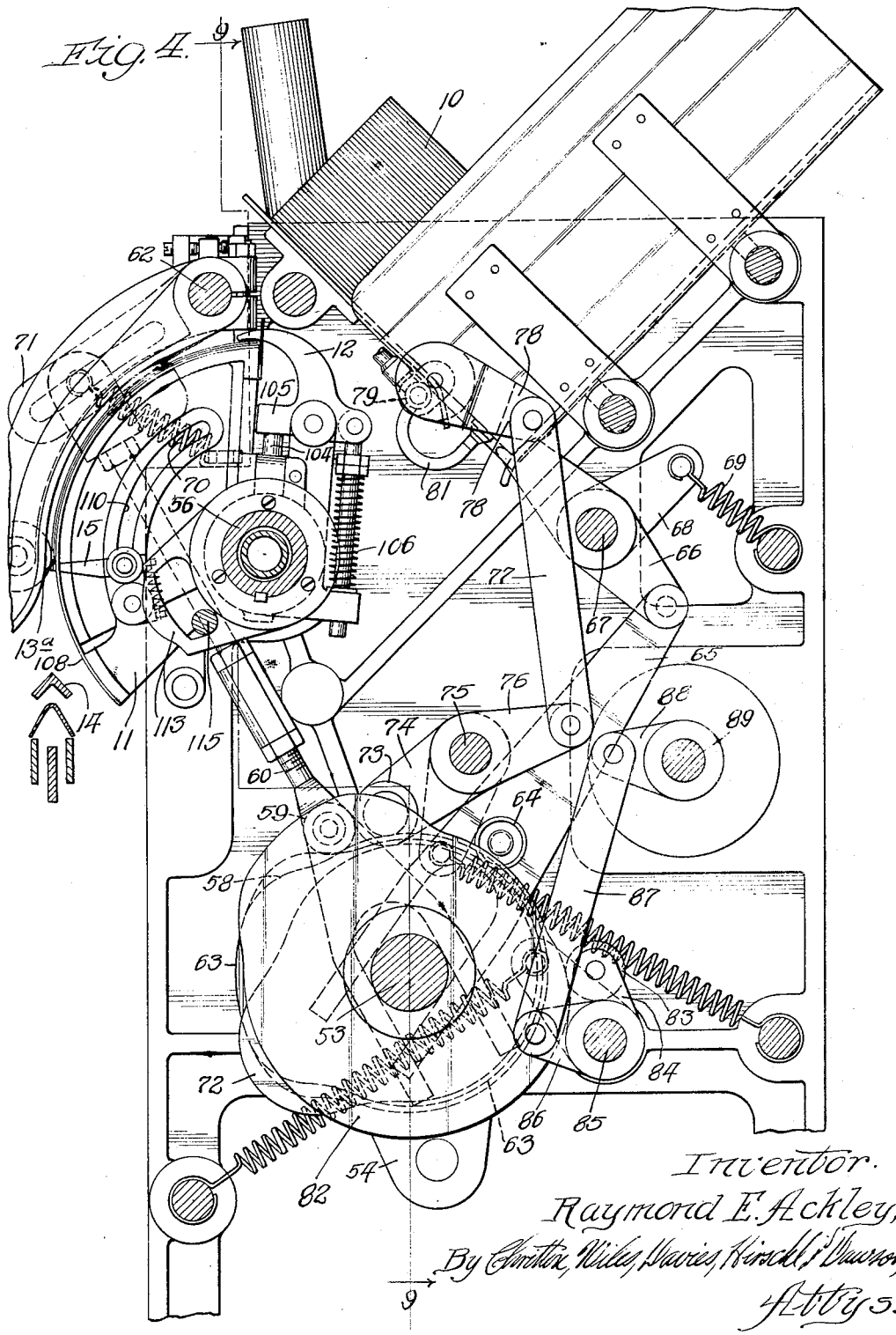

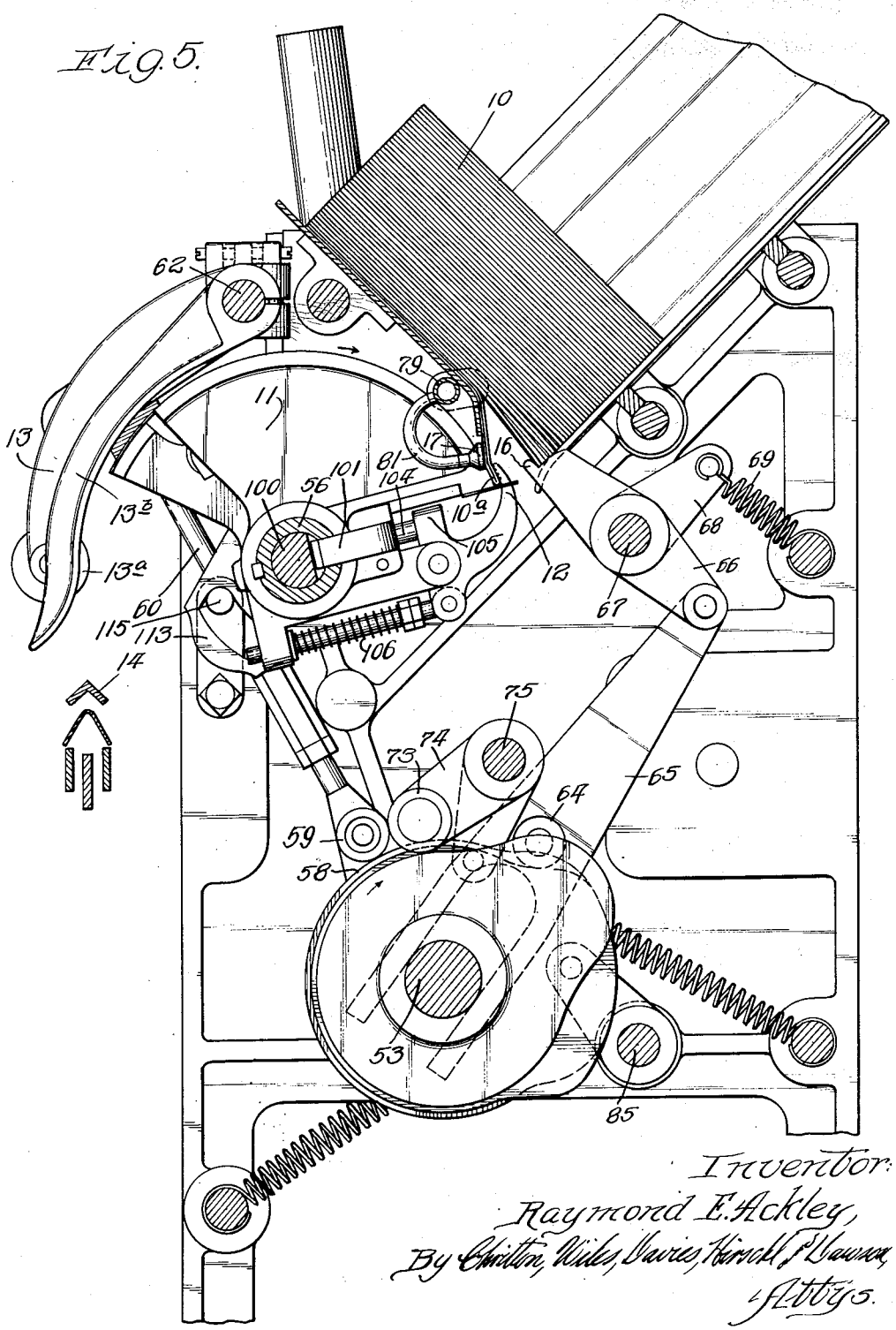

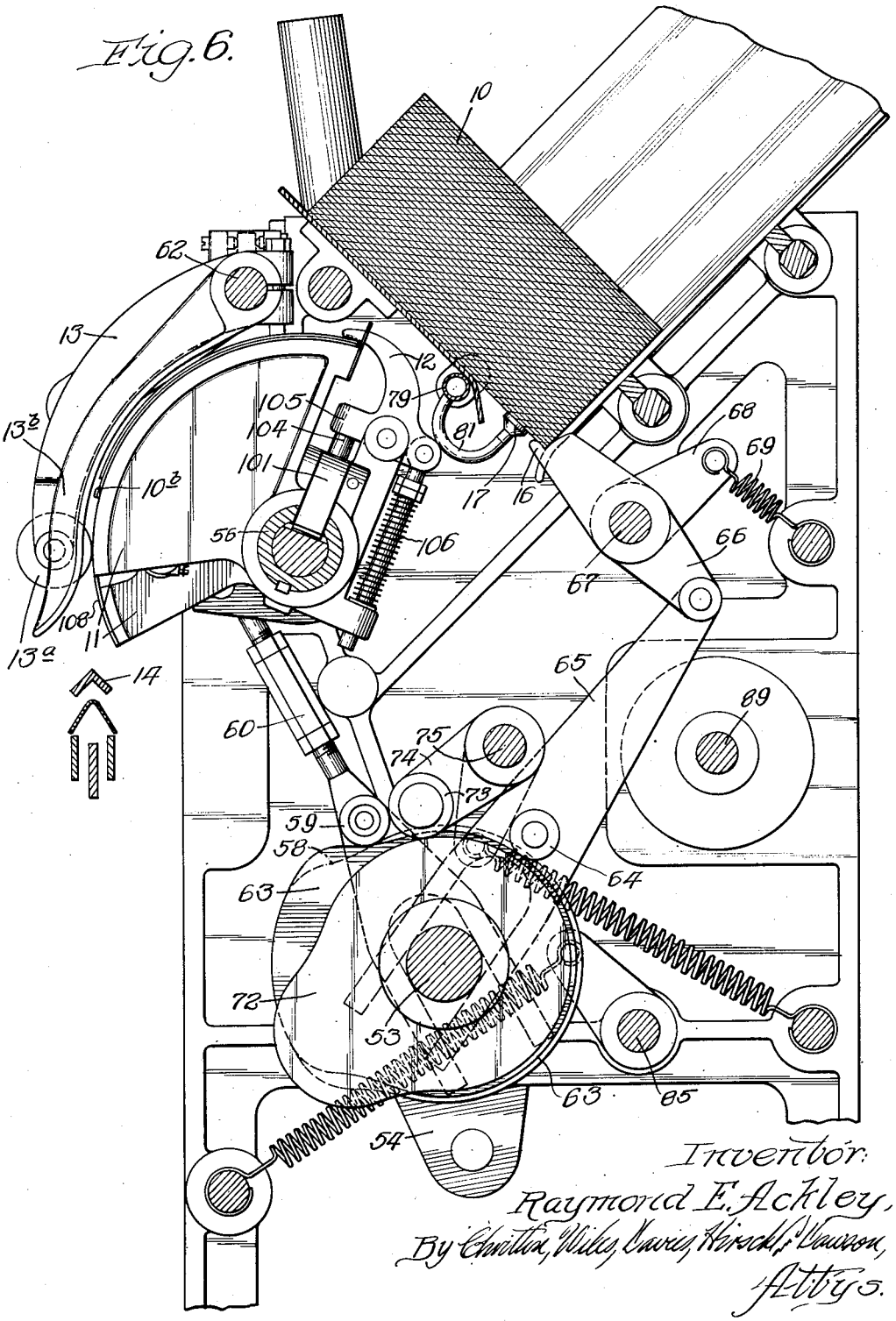

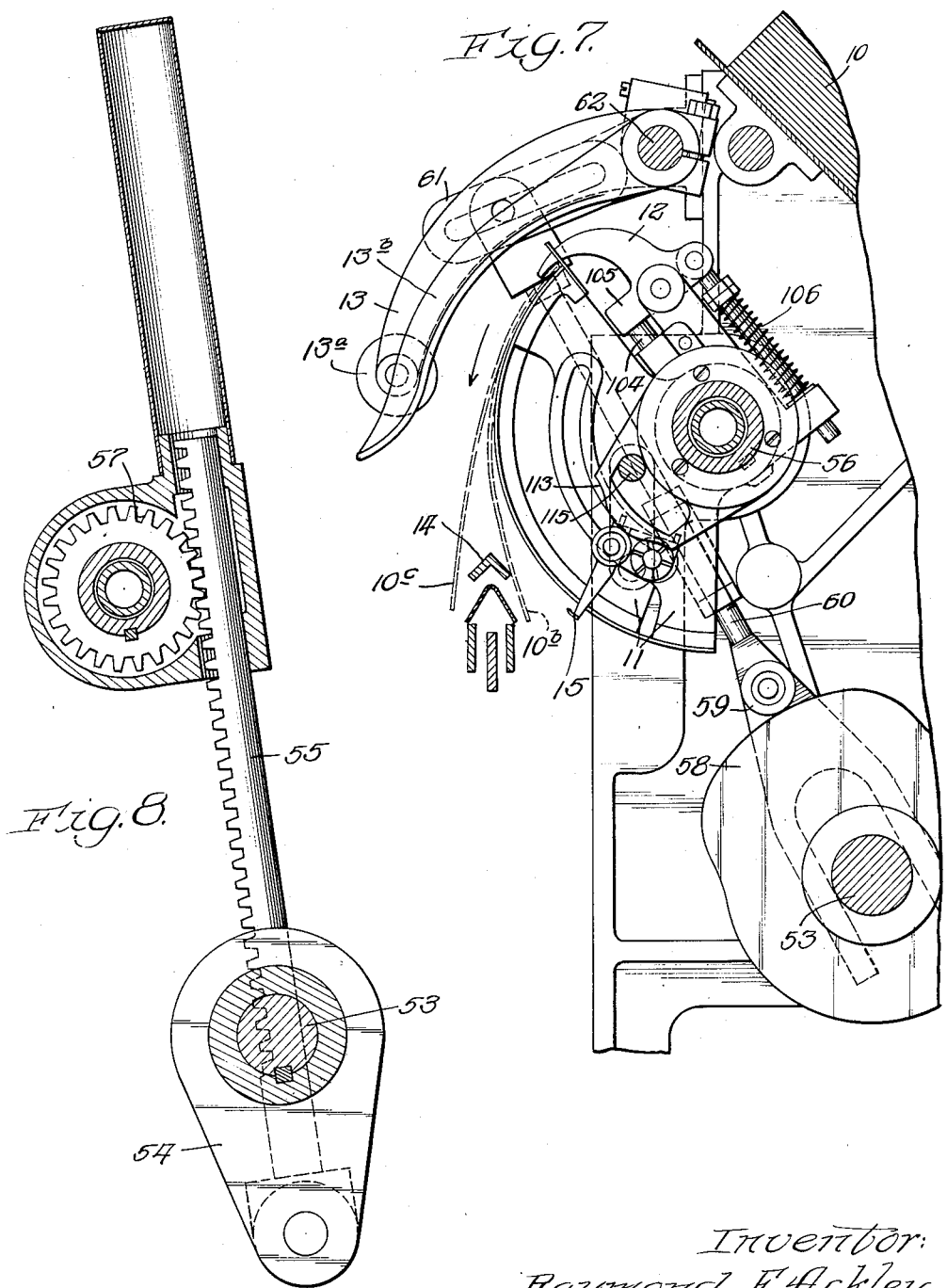

Oct. 29, 1940.     R. E. ACKLEY     2,219,608
FEEDER FOR STITCHING MACHINES
Filed April 29, 1939     10 Sheets—Sheet 8

Inventor:
Raymond E. Ackley,
By Christen, Wiles, Davies, Hinkle & Watson,
Attys.

Oct. 29, 1940.                R. E. ACKLEY                2,219,608
                       FEEDER FOR STITCHING MACHINES
                        Filed April 29, 1939        10 Sheets-Sheet 9

Inventor:
Raymond E. Ackley,
By Chritton, Wiles, Davies, Hindle & Dawson,
Attys.

Oct. 29, 1940.                R. E. ACKLEY                 2,219,608
                      FEEDER FOR STITCHING MACHINES
                  Filed April 29, 1939      10 Sheets-Sheet 10

Inventor:
Raymond E. Ackley,
By Chritton, Wiles, Davies, Hirschl & Dawson,
Attys.

Patented Oct. 29, 1940

2,219,608

UNITED STATES PATENT OFFICE 2,219,608

FEEDER FOR STITCHING MACHINES

Raymond E. Ackley, Chicago, Ill.

Application April 29, 1939, Serial No. 270,937

20 Claims. (Cl. 270—54)

This invention relates to improvements in feeder for stitching machine and more especially such a feeder in combination with a saddle stitcher.

The saddle type of stitcher operating upon the folded signatures is well known in the art and need not be described or shown here. This type of stitcher embodies a long moving chain, for conveying the gathered signatures to the stitching mechanism, overlying which are a series of saddles in fixed positions. Operators at each station place individual signatures, taken from a convenient pile, astride these saddles, with one ply hanging on each side of both chain and saddle, and the folded edge resting on the apex of the saddle. Suitable lugs or pushers on the chain engage the back margin of each signature so placed and push it off the end of the saddle, so that it drops a short distance to the top of the chain. The chain is placed a sufficient distance below the saddles so that any signatures which are resting astride the chain will pass below succeeding saddles. Thus the signature furthest from the stitching mechanism is dropped directly on the chain, the next signature over the first, and so on in succession until all the signatures are gathered in inset relation. A folded cover may then be dropped over the signature group, having been fed from a saddle in the same manner as the signatures. The gathered book is then conveyed to the stitching mechanism, where it comes to rest momentarily to receive a staple or staples through the folded edges to secure the signatures of each group. Heretofore it has been customary to place the signatures on the saddle at each station by hand. This was referred to as hand gathering or feeding. That is, an operator sat at each station and took one signature at a time from the stack at that station, opened it slightly, and placed it over the saddle to be picked up by the pusher and then grouped with other signatures, and the entire group carried to the stitching mechanism to receive the staples.

This invention comprises an automatic mechanical feeder for the saddle type stitching machine to replace the manual feeding by operators heretofore commonly employed in connection with this type of stitcher. For the purpose of illustrating the invention, I have here shown a single feeder operating in connection with a single stack of signatures to feed the same one by one to the saddle of a saddle stitcher. It is to be understood, however, that in regular use there may be one or more of such feeders, ordinarily more than one; one feeder operating in connection with each stack of signatures from which the saddle stitcher is supplied.

In speaking of a folded signature, it is to be understood also that I include a single sheet with one or more folds, and also one or more sheets with one or more folds. As a matter of fact, the single signature may comprise practically any arrangement or formation of paper including one or more sheets as long as such signature can hang over the saddle or ride astride of the saddle with one ply hanging down on each side and one or more folded edges resting on the apex or top of the saddle. In this connection it is to be noted also that in the use of the term "ply" I mean to include one or more thicknesses or sheets of paper. For example, if the signature comprises but one sheet with one fold, there will be but one single thickness ply on each side of the saddle. However, in the case of a single sheet with several folds or in the case of a plurality of sheets, each ply of the signature may include a plurality of sheets or thicknesses. I am using the term "ply" merely in a general sense to indicate that portion or portions of a signature hanging on one side of the saddle in contradistinction to that portion or portions hanging on the opposite side of the saddle. Also, the saddle stitcher may operate in conjunction with but a single stack of signatures, for example, where each signature comprises one or more sheets having a plurality of folded edges resting on the saddle through which staples are to be inserted to hold the plurality of folded edges of the single signature together. In most cases, however, the stitcher will operate in conjunction with a plurality of stacks of signatures to unite groups of signatures, each group containing a signature from each stack.

By the use of my invention comprising an automatic mechanical feeder, the manual feeding by operators may be dispensed with, thereby increasing the speed and accuracy of the feeding and materially reducing labor costs.

The simplest form of signature may be visualized as a single sheet of paper with one fold substantially at the middle; and I have here shown such a signature to illustrate the invention. Ordinarily, however, the fold is not exactly at the middle as it is desirable that the edges of the signature be not exactly even. That is, it is preferable to make the fold slightly off-center so that one edge of one ply of the signature will overlap the other. For reasons to be hereinafter explained, the provision of such an overlapping edge is utilized in the feeder I have shown.

Other features and advantages will appear more fully as I proceed with my specification.

Figure 2:
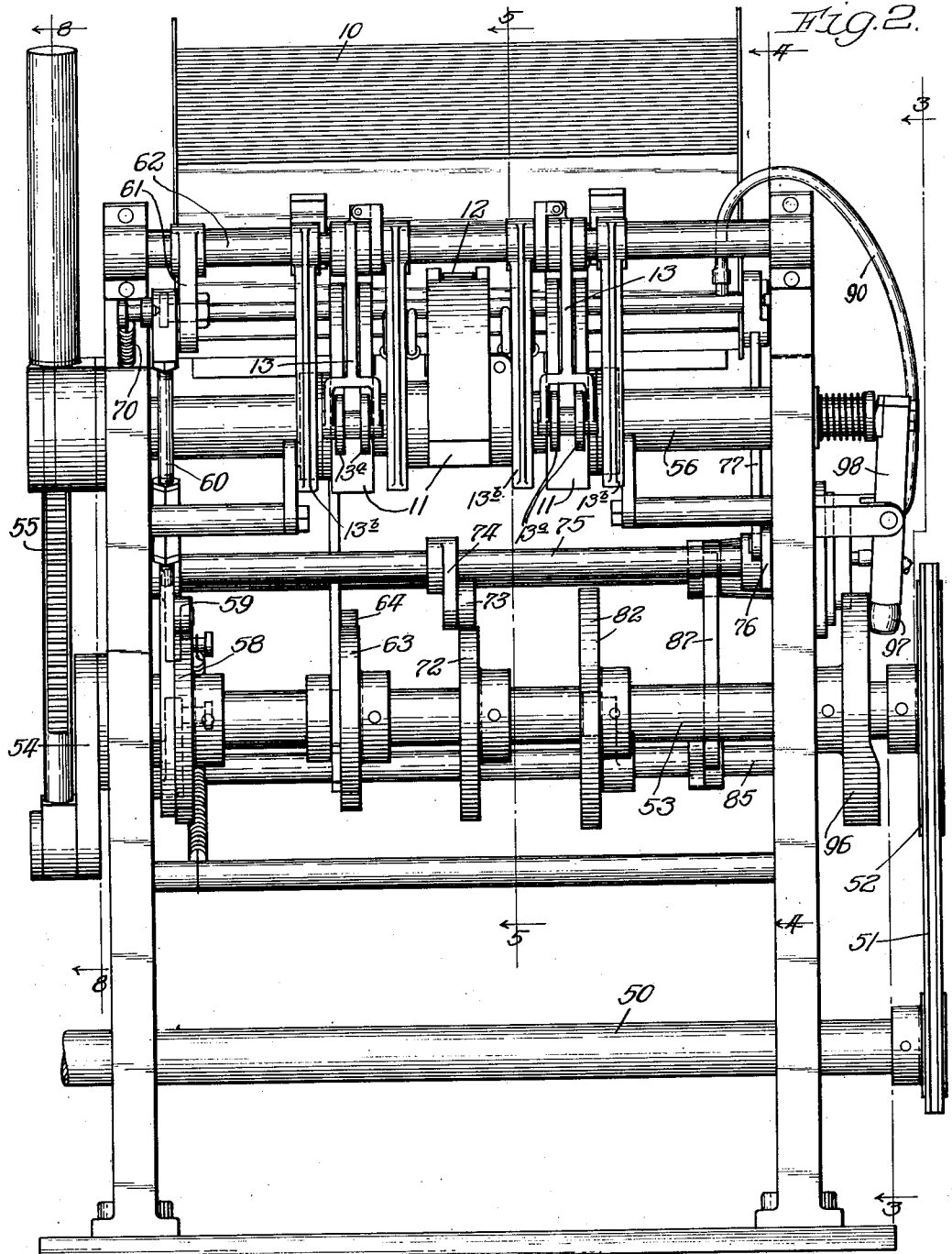
Figure 9:
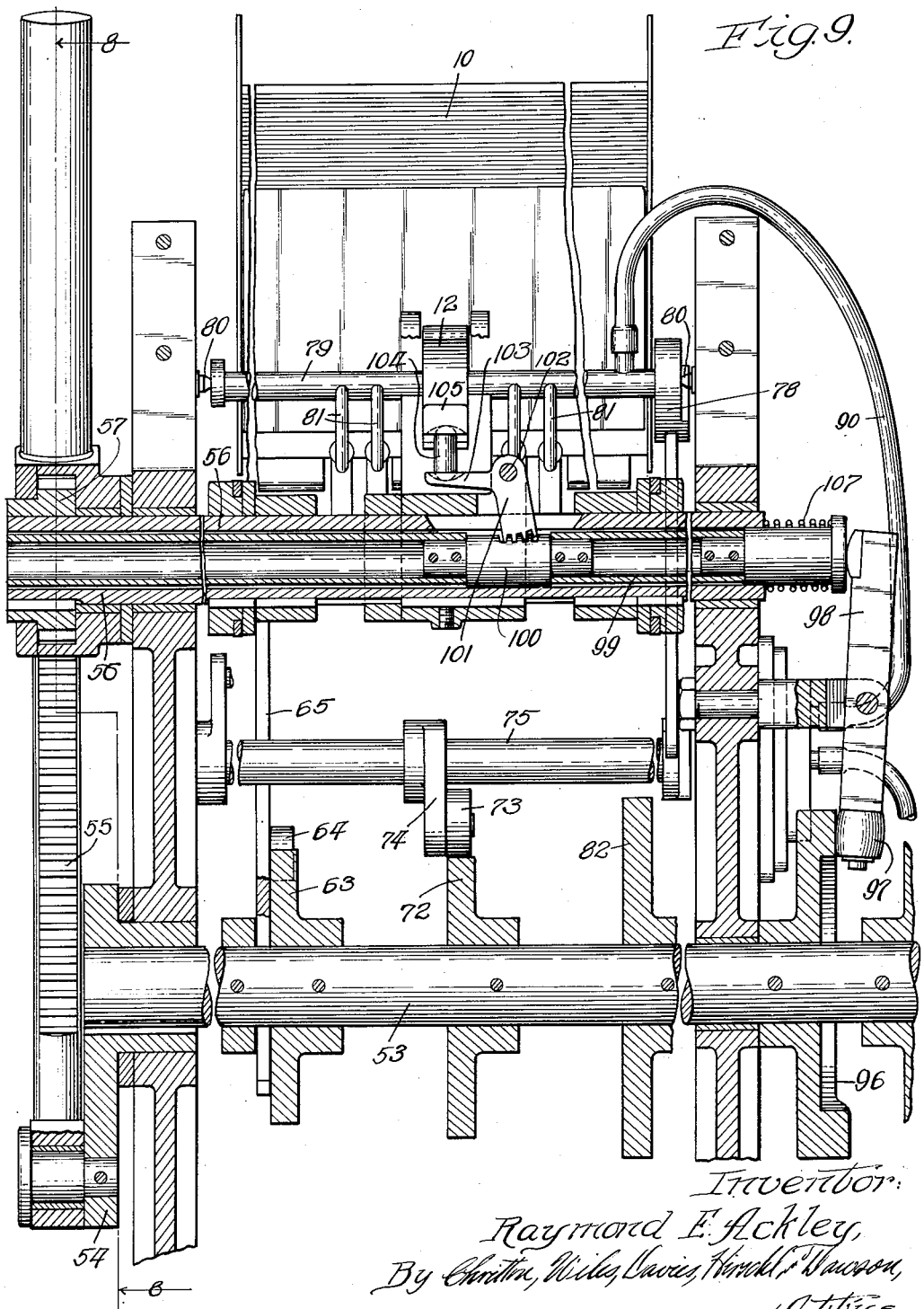
Figure 10:
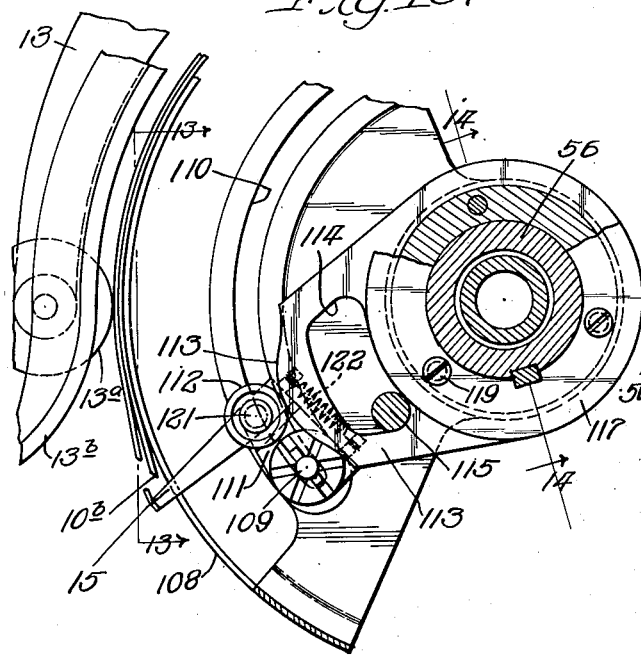
Figure 13:
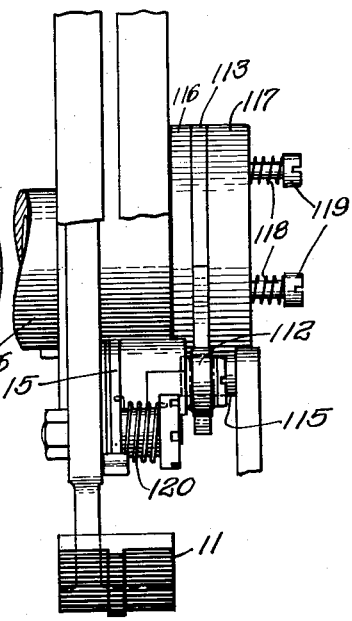
Figure 11:
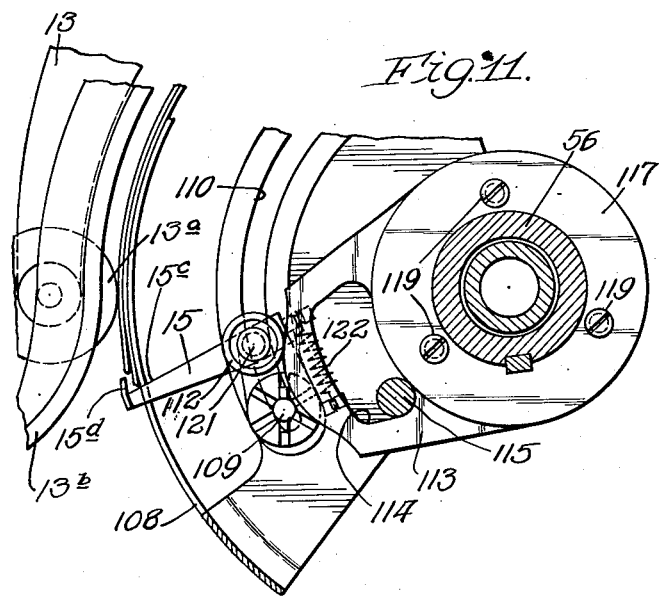
Figure 14:
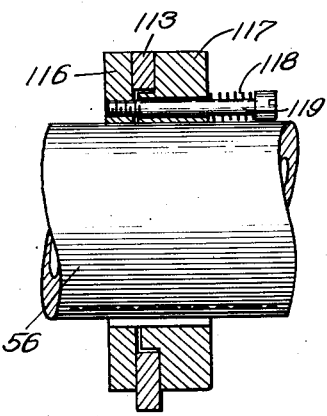
Figure 12:
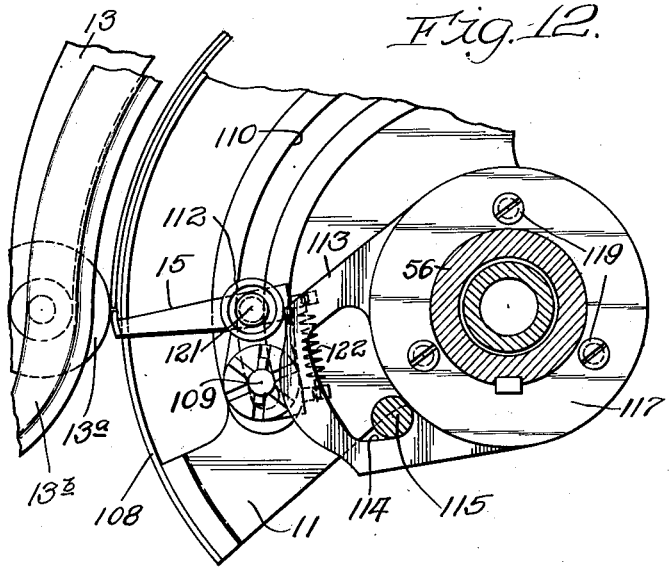
Figure 17:
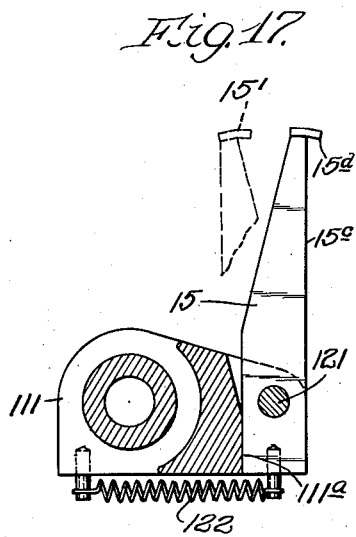
Figure 15:
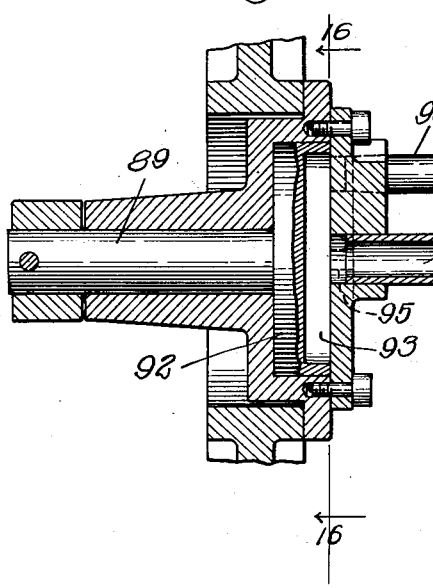
Figure 16:
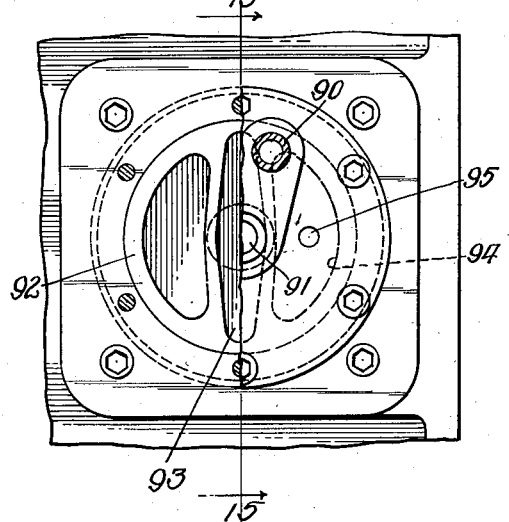

In that form of device embodying the features of my invention, shown in the accompanying drawings—Fig. 1 is a view in end elevation; Fig. 2 is a view in side elevation; Fig. 3 is a view taken as indicated by the line 3 of Fig. 2; Fig. 4 is a view taken as indicated by the line 4 of Fig. 2; Fig. 5 is a view taken as indicated by the line 5 of Fig. 2, showing the mechanism at the time the signature is withdrawn from the supply hopper; Fig. 6 is a similar view showing the signature withdrawn to the extreme outward position; Fig. 7 is a fragmentary view similar to Fig. 6 showing the parts in a different position; Fig. 8 is a detail view showing the rack bar that operates the drum, taken as indicated by the line 8 of Fig. 9; Fig. 9 is a view taken as indicated by the line 9 of Fig. 4; Fig. 10 is a fragmentary view showing the clamp on the drum and the operating cam therefor, the parts being shown in the position just before the signature lap is engaged; Fig. 11 is a similar view with the lap partially engaged; Fig. 12 shows the same parts with the signature lap completely engaged; Fig. 13 is a view taken as indicated by the line 13 of Fig. 10; Fig. 14 is a view taken as indicated by the line 14 of Fig. 10; Fig. 15 is a view taken as indicated by the line 15 of Fig. 16; Fig. 16 is a view taken as indicated by the line 16 of Fig. 15; and Fig. 17 is an enlarged sectional view of the clamp holding arm and clamp.

A general description preceding the detailed description will aid in understanding the construction and operation of the machine.

10 indicates a stack of signatures with their folded edges lowermost. 11 indicates an oscillating segmental feeder drum, and 12 a gripper thereon. 13, 13 are presser feet carrying the rollers 13a, 13a. 14 indicates the saddle of the saddle stitcher. 15, 15 indicate clamps on the drum to clamp the overlapping edge of the signature. 16, 16 indicate fingers to support the folded edges of the stack of signatures. 17, 17 indicate suckers to pull down the folded edge of the bottom signature to free it from the supporting fingers 16.

In operation, the drum oscillates through an arc of about 310°. One stroke may be referred to as the signature-withdrawing stroke, the gripper 12 gripping the folded edge of the bottom signature (previously separated from the stack by the suckers 17), withdrawing the signature from the stack and carrying it to a position above the saddle, as shown in Fig. 6. The return stroke may be referred to as the signature-delivering and positioning stroke, the drum during this movement first delivering the signature to the saddle (the beginning of this movement being shown in Fig. 7) and then continuing its movement to a position to grip another signature.

During the movements mentioned, the parts are timed substantially as follows. Starting with the parts in the position shown in Fig. 5, the gripper 12 on the drum 11 has gripped the folded edge 10a of the bottom signature of the stack 10. This edge of the bottom signature has previously been separated from the rest of the stack and released from the supporting fingers 16 by the suckers 17, which, through reduced air pressure, have attached themselves to the undersurface and then swung downwardly to pull down the edge. Immediately after the gripper 12 grips the folded edge, suction in the suckers 17 is relieved to release the suckers.

After the gripper 12 has gripped the folded edge of the bottom signature, as shown in Fig. 5, the drum 11 rotates in a clockwise direction (as viewed in this figure) through an arc of about 310°, this movement being referred to as the signature-withdrawing stroke. During this movement the gripper 12 holds the folded edge, and the rollers 13a of the presser feet are held adjacent the periphery of the drum to hold the signature against the drum. The guide arms 13b work with the presser feet and assist in holding the signature adjacent the drum during the withdrawing stroke. The signatures are arranged in the stack so that when removed therefrom, the overlapping edge 10b of the signature will lie adjacent the drum. Shortly after this overlapping edge passes the rollers 13a on the presser feet, the clamps 15 clamp the overlapping edge of the signature. With the folded edge of the signature gripped by the gripper 12 and the overlapping edge clamped by the clamp 15, the drum continues its signature-withdrawing stroke until it reaches the position shown in Fig. 6 with the signature in position above the saddle 14. The amount of movement of the drum after the clamps 15 close may be very little or even none depending on the width of the signature. From this position it starts its return stroke, moving in a counterclockwise direction (as viewed in Figs. 5 and 6). Shortly after the commencement of this stroke the presser feet 13 with the rollers 13a and the members 13b are raised, as shown in Fig. 7, permitting the overlapped edge 10c of the outer ply of the signature to be thrown outwardly by centrifugal force and by entry of air between the two plies. As this separation starts, the ply adjacent the drum is held against the drum by the clamps 15. As the return stroke of the drum continues, the outer ply will, therefore, come down on the outside of the saddle while the inner ply, being held next to the drum, will come down on the inside of the saddle. Just after the lower edge 10b of the inner ply is slightly below the top of the saddle, the clamps 15 release this edge 10b from the drum so that during the continued return stroke of the drum the separated plies of the signature will come down one on each side of the saddle 14, as shown in Fig. 7. After the folded edge of the signature is somewhat lower than the position shown in Fig. 7 so that the signature when released will drop on the saddle, the gripper 12 releases the folded edge, thus discharging the signature from the drum onto the saddle. From this point on, the drum continues its return stroke to a position to grip another signature. During this completion of the return stroke the gripper 12 remains open until the folded edge of the next signature, which has been separated from the stack by the suckers, enters between the gripper and the drum, whereupon the gripper closes to the position shown in Fig. 5 to grip the signature and start a new signature-withdrawing stroke as above described.

It will be seen from the above description that the complete cycle includes a signature-withdrawing stroke and a return stroke, the first portion of the return stroke delivering the signature to the saddle and the remaining portion positioning the drum for the commencement of another signature-withdrawing stroke.

A serious difficulty heretofore encountered in machines which open a signature by means of a lap which is gripped to hold one-half of the signature during the opening, is that it is difficult to insure either the exact position or the width of this lap.

Since the paper included in the lap is afterward trimmed off and wasted, the lap is always kept as narrow as possible. Folding mechanism, however, whether on a web press or on a special folding machine, does not operate with exact uniformity. On some signatures, the lap will be wider than other signatures; also the paper is frequently "fanned out" to a greater or lesser extent, that is, the edges of some of the pages in the lap extend further than others. The signature itself may also vary in width, either because not folded on the proper line, or in the case of signatures from web presses, because the amount of paper cut from the web at each revolution varies slightly. Finally, in feeding the signature to the opening mechanism, the position of the lap with reference to the clamping means may vary somewhat.

It will be evident that the successful operation of mechanism for clamping a lap on a signature depends on several factors. The edge of the clamp must cover all of the pages on one-half of the signature, but none of the pages on the other half. To insure this the lamp must be of such width that the clamp will not only hold the paper securely, but that allowance is made for all probable variations both in position and width of the lap. This requires a comparatively wide lap and a considerable waste of paper.

In order to overcome this disadvantage, I provide a clamping means for the lap which does not operate in one fixed position as heretofore, but is guided into its operating position by the edge of the signature itself. The lap may therefore vary considerably in position without affecting the operation of the clamp, and the latter need only be wide enough to securely hold the paper. By this means I am able to operate with a lap much narrower than has hitherto been considered necessary, with corresponding economy of paper. The action of the clamp in engaging the edge of the signature is shown in Figs. 10, 11 and 12.

Having given a general description of the construction, timing, and function of the principal parts, I shall now give a more detailed description of the mechanism for operating the same.

The segmental drum has been referred to in general by the reference numeral 11. As a matter of fact, this drum includes three sector-shaped portions (see Fig. 2) the center one carrying the gripper 12 and the other two each carrying one of the clamps 15.

The fingers 16 supporting the folded edges of the stack of signatures also oscillate somewhat to assist the suckers 17 in separating the folded edge of the bottom signature from the stack. In the position shown in Fig. 6, the fingers 16 are at the top of their oscillation and the suckers 17 are in position to attach themselves to the bottom signature. After their attachment, the fingers 16 are rocked downwardly slightly, whereupon the suckers 17 are pulled downwardly to pull the bottom signature loose from the fingers. The fingers then move upwardly again to give support to the remaining signatures in the stack.

The machine is driven from a line shaft 50 operating the chain 51 to drive the sprocket 52 on the main shaft 53.

The main shaft 53 carries a crank 54 operating the rack bar 55 to oscillate the hollow shaft 56 through the medium of the pinion 57 thereon. The hollow shaft 56 carries the drum segments 11, 11, 11.

58 indicates a cam on the shaft 53 operating the cam roller 59 on the bar 60 connected to the crank 61 on the rock shaft 62 carrying the members 13 and 13b.

63 indicates a cam on the shaft 53 operating the cam roller 64 on the bar 65 having its upper end pivoted to the crank 66 on the rock shaft 67 carrying the fingers 16. The rock shaft 67 is yieldingly held in one limit of its movement by the arm 68 connected to the spring 69. The lower end of the bar 65 is forked to straddle the main shaft 53 to hold the bar in alignment.

The rock shaft 62 operates against spring tension imposed upon the same by the spring 70 connected to the arm 71 on the shaft 62.

72 indicates a cam on the shaft 53 operating the cam roller 73 on the arm 74 on the rock shaft 75 which operates through the arm 76, the link 77, and the arm 78 to rock the pipe 79 on the trunnions 80, 80. The pipe 79 carries the curved pipes 81, upon the ends of which are mounted the suckers 17.

82 indicates a cam on the shaft 53 operating through the cam roller 83 on the arm 84 on the shaft 85 to rock the arm 86 which in turn operates through the link 87 and arm 88 to rock the shaft 89 operating the valve to control the air suction on the suckers 17. This valve is shown in Fig. 15. 90 is a pipe leading to the pipe 79. 91 is the main suction line. The shaft 89 carries the head 92 with the port 93 which connects the pipes 90 and 91 when suction is to be applied to the suckers and disconnects when the suction is to be released. Any suitable means may be provided for venting the pipe 90 when the suction is shut off. For example, the head 92 may be provided with a port 94 connecting the line 90 with the vent 95 when the port 93 is turned to cut off the suction.

96 indicates a cylindrical cam on the shaft 53 operating the cam roller 97 on the rock arm 98 which operates the inner shaft 99 lying inside of the hollow shaft 56. The inner shaft 99 carries a short rack bar 100, the teeth of which engage teeth on the end of one arm 101 of a bell crank pivoted at 102. The other arm 103 of the bell crank operates through the pin 104 against the arm 105 carried by the gripper 12 to raise the same against the pressure exerted by the spring 106. 107 indicates a spring on the outer end of the inner shaft 99 urging the same outwardly against the end of the pivoted arm 98.

The clamps 15 are mounted in slots 108 in the outer portions of the drums 11. Each clamp 15 is pivoted by a pivot 121 on the arm 111, and is held in position against the surface 111a by means of a light spring 122, but can be forced back to the position 15' by slight pressure. The arm 111 is itself carried on an adjustable pivot 109 mounted in the slot 110 on the drum. The outer end of the arm 111 carries a cam roller 112 operated by a loose cam 113 on the hollow shaft 56. The cam is provided with a slot 114 embracing a stationary member 115 so that slight rocking of the cam is permitted with respect to the member 115. Frictional engagement is provided between the shaft and cam, as shown in Fig. 14. Each cam 113 is frictionally clamped between the two discs 116 and 117 on the shaft 56, the two discs being pulled together by springs 118 on the pins 119. In operation the cam rollers 112 will move the cams 113 with them in each direction until movement of the cam is stopped by the member 115, whereupon the rollers will ride over the cam surfaces to release the clamps 15. In other words, there is some lost motion between the cams and the shaft 56 so that in the withdrawing stroke of the drum the clamps 15 will engage the overlapping edge of the signature at a higher point than the point at which they release during the return stroke of the drum. As stated before, in the withdrawing stroke the clamps engage shortly after the lower edge of the signature passes the rollers 13a. In the delivering stroke, they release the lower edge at a lower point; that is, shortly after the edge is a little bit below the saddle. 120 indicates a spring yieldingly holding the cam roller 112 against the cams 113.

To engage the signature lap, the arm 111 is first rocked back by the cam 113, as described, until the clamp 15 is positioned back of the edge 10b of the signature, as shown in Fig. 10. The arm 111 is preferably so positioned in the slot 110 that the shank portion 15c of the clamp makes contact with the overlapping edge 10b of the signature before the lip 15d of the clamp engages, as shown in Fig. 11. During the final engaging motion of the clamp the shank 15c will yield under the tension of the spring 122 so that, in effect, the lip 15d will be guided vertically downwardly into engagement with the edge 10b of the signature itself. Thus the final relation of the clamp lip 15d to the edge 10b of the signature will be as shown in Fig. 12, even though the position of the lap with respect to the drum may vary.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

What I claim as new, and desire to secure by Letters Patent, is:

1. Apparatus of the character described, including: a support for a stack of folded signatures; a saddle adjacent the support; means for separating the folded edge of a bottom signature from a stack on the support; an oscillating drum; a gripper on the drum; and means for operating the gripper and drum to grip the folded edge of a bottom signature separated from the stack, withdraw it from the stack, and deposit it in opened condition astride the saddle.

2. Apparatus of the character described, including: a support for a stack of folded signatures; a saddle adjacent the support; means for separating the folded edge of a bottom signature from a stack on the support; a drum; a gripper on the drum; means for operating the gripper and rotating the drum to grip the edge of a bottom signature separated from the stack, withdraw it from the stack, and move it to a position above the saddle; and means for rotating the drum in a reverse direction and releasing the gripper to deposit the signature in opened condition astride the saddle.

3. Apparatus of the character described, including: a support for a stack of folded signatures; a saddle adjacent the support; means for separating the folded edge of a bottom signature from a stack on the support; a drum; a gripper on the drum; means for rotating the drum in one direction through a withdrawing stroke, and operating the gripper thereon, to grip the edge of a bottom signature separated from the stack, withdraw it from the stack, and move it to a position above the saddle; and means for rotating the drum in a reverse direction through a return stroke, and operating the gripper thereon, first to release the signature and deposit it in opened condition astride the saddle, and then to return to position for the commencement of another withdrawing stroke.

4. Apparatus of the character described, including: a support for a stack of folded signatures with the edge of one ply overlapping the other; a saddle adjacent the support; means for separating the folded edge of a bottom signature from a stack on the support; an oscillating drum; a gripper on the drum; a clamp on the drum; means for operating the gripper to grip the folded edge of a bottom signature separated from the stack; means for rotating the drum in one direction through a withdrawing stroke to withdraw the signature from the stack; means for operating the clamp during the withdrawing stroke to clamp the overlapping edge of one ply; and means for rotating the drum in a reverse direction through a return stroke and releasing first the clamping means and then the gripping means, to deposit the signature on the saddle.

5. Apparatus of the character described, including: a support for a stack of folded signatures with the edge of one ply overlapping the other; a saddle adjacent the support; means for separating the folded edge of a bottom signature from a stack on the support; an oscillating drum; a gripper on the drum; a clamp on the drum; means for operating the gripper to grip the folded edge of a bottom signature separated from the stack; means for rotating the drum in one direction through a withdrawing stroke to withdraw the signature from the stack; means for operating the clamp during the withdrawing stroke to clamp the overlapping edge of one ply; and means for rotating the drum in a reverse direction through a return stroke and releasing first the clamping means and then the gripping means, to deposit the signature on the saddle, and continuing the return stroke to position the drum for the commencement of another withdrawing stroke.

6. Apparatus of the character described; including: a support for a stack of folded signatures with the edge of one ply overlapping the other; a saddle adjacent the support; means for separating the folded edge of a bottom signature from a stack on the support; an oscillating drum; a gripper on the drum; a clamp on the drum; means for operating the gripper to grip the folded edge of a bottom signature separated from the stack; means for rotating the drum in one direction through a withdrawing stroke to withdraw the signature from the stack and move it to a position above the saddle; means for operating the clamp during the withdrawing stroke to clamp the overlapping edge of one ply; and means for rotating the drum in a reverse direction through a return stroke and releasing first the clamping means and then the gripping means, to deposit the signature on the saddle.

7. Apparatus of the character described, including: a support for a stack of folded signatures with the edge of one ply overlapping the other; a saddle adjacent the support; means for separating the folded edge of a bottom signature from a stack on the support; an oscillating drum; a gripper on the drum; a clamp on the drum; means for operating the gripper to grip the folded edge of a bottom signature separated from the stack; means for rotating the drum in one direction through a withdrawing stroke to withdraw the signature from the stack and move it to a position above the saddle; means for operating the clamp during the withdrawing stroke to clamp the overlapping edge of one ply; and means for rotating the drum in a reverse direction through a return stroke and releasing first the clamping means and then the gripping means, to deposit the signature on the saddle, and continuing the return stroke to position the drum for the commencement of another withdrawing stroke.

8. Apparatus as claimed in claim 2, with means for holding the signature adjacent the drum while being moved to a position above the saddle; and means for rendering said holding means inoperative during a portion of the rotation of the drum in a reverse direction.

9. Apparatus as claimed in claim 3, with means for holding the signature adjacent the drum while being moved to a position above the saddle; and means for rendering said holding means inoperative during a portion of the rotation of the drum through its return stroke.

10. Apparatus as claimed in claim 4, with means for holding the signature adjacent the drum during a portion of the withdrawing stroke; and means for rendering said holding means inoperative during a portion of the return stroke.

11. Apparatus as claimed in claim 5, with means for holding the signature adjacent the drum during a portion of the withdrawing stroke; and means for rendering said holding means inoperative during a portion of the return stroke.

12. Apparatus as claimed in claim 6, with means for holding the signature adjacent the drum during a portion of the withdrawing stroke; and means for rendering said holding means inoperative during a portion of the return stroke.

13. Apparatus as claimed in claim 7, with means for holding the signature adjacent the drum during a portion of the withdrawing stroke; and means for rendering said holding means inoperative during a portion of the return stroke.

14. Apparatus as claimed in claim 4, in which the means for clamping the edge of the overlapping ply is operated by a cam relatively movable with respect to the drum.

15. Apparatus as claimed in claim 1, in which the drum is supported on a hollow shaft and in which the gripper is operated by a rack bar in said shaft.

16. Apparatus of the character described, including: a support for a stack of folded signatures with the edge of one ply overlapping the other; a saddle adjacent the support; means for separating the folded edge of a bottom signature from a stack on the support; a drum; a gripper on the drum; a clamp on the drum; means for operating the gripper to grip the folded edge of a bottom signature separated from the stack; means to rotate the drum to position the signature above the saddle with the folded edge uppermost; means operative during the motion of the drum to operate the clamp to clamp the overlapping edge of the signature; and means to release the gripper and the clamp while the signature is positioned above the saddle and allow said signature to drop astride the saddle.

17. Apparatus of the character described, including: a support for a stack of folded signatures with the edge of one ply overlapping the other; a saddle adjacent the support; means for separating the folded edge of a bottom signature from a stack on the support; a drum; a gripper on the drum; a clamp on the drum; means for operating the gripper to grip the folded edge of a bottom signature separated from the stack; means to rotate the drum to position the signature above the saddle with the folded edge uppermost; means operative during the motion of the drum to first position the clamp against the overlapping edge of the signature and then clamp said edge; and means to release the gripper and the clamp while the signature is positioned above the saddle and allow said signature to drop astride the saddle.

18. Apparatus of the character described, including: a support for a stack of folded signatures with the edge of one ply overlapping the other; a saddle adjacent the support; means for separating the folded edge of a bottom signature from a stack on the support; a drum; a gripper on the drum; a yieldably mounted clamp on the drum; means for operating the gripper to grip the folded edge of a bottom signature separated from the stack; means to rotate the drum to position the signature above the saddle with the folded edge uppermost; means operative during the motion of the drum to cause the shank of said yieldably mounted clamp to first contact the overlapping edge of the signature and thereafter guide the clamp into engagement with said edge; and means to release the gripper and the clamp while the signature is positioned above the saddle and allow said signature to drop astride the saddle.

19. Apparatus of the character described, including: a drum adapted to support a signature with the edge of one ply overlapping the other; a gripper on said drum adapted to grip the folded edge of a signature; a clamp on said drum adapted to clamp the overlapping edge of said signature; and means to first position the clamp against the overlapping edge of said signature and then clamp said edge.

20. Apparatus of the character described, including: a drum adapted to support a signature with the edge of one ply overlapping the other; a gripper on said drum adapted to grip the folded edge of a signature; a yieldably mounted clamp on the drum adapted to clamp the overlapping edge of said signature; and means to cause the shank of said yieldably mounted clamp to first contact the overlapping edge of the signature and thereafter guide the clamp into engagement with said edge.

RAYMOND E. ACKLEY.